United States Patent Office 2,704,770
Patented Mar. 22, 1955

2,704,770

CHROMATOGRAPHIC PURIFICATION OF MONOMERIC α-CHLOROACRYLATES

Harry D. Anspon, Easton, Pa., assignor to General Aniline & Film Corporation, New York, N. Y., a corporation of Delaware No Drawing. Application April 23, 1952,
Serial No. 284,003

6 Claims. (Cl. 260—486)

This invention relates to a method of preparing improved polymers, and more particularly to the purification of the monomers employed for producing same.

The polymerization of monomers by various methods in order to produce polymers therefrom is well known, but the production of colorless polymers has been an ever-present problem. Particularly is this the case with polymers derived from esters of α-chloroacrylic acid, such polymers having a known tendency to be produced in a brownish or yellowish coloration or, if initially colorless and transparent, to develop the brown or yellow coloration subsequently. Purification of the monomer is, of course, an obvious expedient but has not met with success in most cases. During the synthesis, storage and shipment of these highly reactive monomers, it is customary to prevent undesired or premature polymerization thereof by the addition thereto of small amounts of polymerization inhibitors. When it is desired subsequently to effect polymerization of the monomer, it is usually necessary to separate out the inhibitors which would tend to interfere with or retard the desired process of polymerization. It has been suggested that such separation be effected by distillation, by treatment with oxidizing or reducing agents and various other expedients. However, such previously employed expedients have not been entirely satisfactory.

It is an object of this invention to provide an improved process of producing colorless polymers. It is another object of this invention to provide an improved method of purifying the monomers prior to polymerization. Other objects and advantages will appear as the description proceeds.

It has been found that the presence of even traces of polymerization inhibitors in monomeric esters of α-chloroacrylic acid produces a yellowish or brownish color in the polymers derived therefrom. The aforementioned objects are attained by the instant invention which involves chromatographic purification of the monomeric esters of α-chloroacrylic acid immediately prior to their subjection to polymerizing conditions. Such chromatographic purification involves contacting the monomers containing the polymerization inhibitors with adsorbents.

The process of the instant invention avoids the disadvantages which accompany the usual vacuum distillation method heretofore employed, in that it may be carried out at room temperature or at any lower temperature but above the freezing point of the monomer. The previously employed distillation methods have, in most cases, failed to completely remove all traces of inhibitor. Further, in the treatment of monomers which are particularly sensitive to raised temperatures, polymerization occurs in greater or lesser amounts during the distillation, and the tendency to polymerize is increased as the amount of inhibitor in the monomer decreases during the distillation process. Not only does this decrease the efficiency of the operation, but it also clogs the apparatus, necessitating frequent delays for cleaning purposes.

The chromatographic purification process of the instant invention is preferably applied to anhydrous monomeric esters of α-chloroacrylic acid since it has been found that the presence of water in the monomers has a detrimental effect upon some properties (heat distortion temperature and heat stability) of the polymers produced therefrom. Further, since the said purification process results in removal of the polymerization inhibitors from the monomers, it is important that the purified monomers not be subjected to any conditions which would tend to produce a premature polymerization. Accordingly, it is preferred that the purification process of the instant invention be applied immediately prior to polymerization to produce the desired products. The process of the invention may be carried out by contacting the monomeric ester of α-chloroacrylic acid with the adsorbent in any manner, as for example by admixture therewith. However, the preferred method involves passing the monomer through a column packed with the adsorbent and previously swept out with an inert gas such as prepurified nitrogen or the like. (The monomer should be kept out of contact with oxygen or should be allowed to contact it only at low temperatures of no more than about $-10°$ C.) As stated above, the temperature during the treatment may range from the freezing point of the monomer (about $-35°$ C. for methyl α-chloroacrylate) to about room temperature or about 20 to 25° C. The time of contact will, of course, be dependent upon the nature of the monomer and adsorbent, the amount of inhibitor present, and various other factors and, in the preferred method, may be controlled by adjustment of the length of the column and the rate of through-put. In order to prevent any undesired or premature polymerization from taking place, the purified monomer is preferably polymerized in known manner immediately following application of the process of this invention in order to produce the desired products. Various methods of polymerization are known and may be employed without detracting from the advantages derivable by use of the instant invention. Thus, the polymerization may be carried out by means of heat, catalysts, ultra-violet light, etc., or any combination thereof.

The preferred adsorbent is activated alumina (aluminum oxide) but other known adsorbents may be employed such as activated carbons or charcoal, fuller's earth and activated bentonites, diatomaceous earth, talc, activated silicic acid, silica gel, the anhydrous forms of the following substances: calcium sulfate, magnesium sulfate, copper sulfate, sodium sulfate, barium carbonate, calcium carbonate, calcium hydroxide, calcium oxide, tricalcium phosphate, magnesium carbonate, magnesium citrate, magnesium oxide, magnesium trisilicate, titanium oxide, calcium silicate, sodium carbonate, zinc oxide, zirconium silicate, potassium carbonate, or the like.

The process of the invention is applicable to monomers which are particularly sensitive to raised temperatures and subject to polymerization during distillation, particularly methyl α-chloroacrylate. The process is particularly applicable to higher boiling esters of α-chloroacrylic acid, as for example, alkyl esters such as ethyl, propyl, isopropyl, butyl, amyl, isoamyl, hexyl, actyl or lauryl esters; alkenyl esters such as allyl, methallyl or crotyl esters; polyhydric alcohol esters such as the ethylene glycol or 1,4-butanediol esters; cycloalkyl esters such as cyclohexyl or methyl-cyclohexyl esters; aralkyl esters such as the benzyl ester; aryl esters such as phenyl or tolyl esters, and heterocyclic esters such as the tetrahydrofurfuryl ester. With many of the higher boiling esters, distillation is very difficult to achieve without serious polymerization losses.

The process of the invention is effective for removing many of the known polymerization inhibiting agents commonly added to the monomeric esters of chloroacrylic acid, such agents, which are usually added in amounts of about 0.1 to 2% by weight of the monomer, fall generally within the class of quinonoid-, phenolic hydroxy-, amino-, nitro- and nitroso-containing compounds as, for example, benzoquinone, toluquinone, phenanthraquinone, chloranil, duroquinone, p-nitrosodimethylaniline, 1-aminoanthraquinone, acenaphthenequinone, benzidine, 2,4-diaminoazobenzene, p-phenylenediamine, N-phenyl α-naphthylamine, N-phenyl β-naphthylamine, hydrazobenzene, nitroso-β-naphthol, o-nitrophenol, 2,4-dinitroaniline, m-dinitrobenzene, dinitro-o-cresol, 2,4-dinitrodiphenylamine, 2,4-dinitrophenol, 2,4-dinitrophenylhydrazine, 2,4-dinitrotoluene, picric acid, picramide, naphthalene picrate, 1,3,8-trinitronaphthalene, 2,2-diphenyl-1-picrylhydrazyl, phenothiazine, hydroquinone, toluhydroquinone, 2,5-ditertiarybutylquinone, 2,5-ditertiarybutylhydroquinone, p-tertiarybutyl catechol, 1,5-dihydroxynaphthalene, N-n-butyl-p-aminophenol, and the like.

Other impurities may be removed by the process of the invention at the same time as, for example, auto-oxidation products, impurities and residues of the monomer synthesis, and other ultra-violet opaque, color-forming impurities. The ultra-violet absorption properties of the purified monomers are greatly decreased in contrast to the properties prior to purification in accordance with the process of the instant invention, and the polymers produced therefrom are substantially colorless and resistant to further coloration on exposure to light.

The following examples illustrate the invention and are not to be regarded as limitative.

Example 1

A sample of 3,000 g. of crude steam distilled and dried methyl α-chlyoroacrylate monomer containing 7.5 g. of picric acid as a polymerization inhibitor was vacuum distilled through a 40 plate 26 mm. I. D. (Internal Diam.) Oldershaw Column. The distilled monomer appeared colorless to the eye and showed 84.9% transmittance to ultra-violet light at 3100 A. U. and 99.0 mol percent purity (by freezing point determination). The distilled monomer was chromatographed at about room temperature by passing it through a column packed with activated alumina and previously swept out with prepurified nitrogen. A small yellow band of picric acid was adsorbed at the top of the chromatographic column and the distilled and chromatographed monomer showed 87.9% transmittance at 3100 A. U. and 99.1 mol percent purity, indicating that the chromatographic purification process had removed the very slight remaining amount of inhibitor with a resultant substantial decrease in opacity to ultra-violet light.

Polymer prepared from the monomer of the composition of the aforementioned distilled monomer before chromatographic purification was light yellow in color, whereas the polymer prepared from the monomer from which the inhibitor had been removed by chromatographic adsorption was colorless and of excellent stability to light.

Example 2

The process of Example 1 was repeated except that the polymerization inhibitor was p-tert-butylcatechol instead of picric acid. Improved properties similar to those obtained in Example 1 were observed in the polymer produced from the monomer from which the inhibitor had been removed by chromatographic adsorption as compared with those of the polymer prepared from the distilled but unchromatographed monomer.

Various modifications and variations of this invention will be obvious to a person skilled in the art and such variations and modifications are to be regarded as within the purview of this application and the spirit and scope of the appended claims.

I claim:

1. A method comprising subjecting a composition consisting of an anhydrous ester of α-chloroacrylic acid and a polymerization inhibitor to chromatographic purification by contacting said composition with a solid anhydrous adsorbent for said inhibitor in an inert atmosphere and at a temperature of from about −35° C. to about 25° C. for a time sufficient to remove the chromatographic impurities whereby the resultant anhydrous ester of α-chloroacrylic acid is adapted to form colorless polymers upon polymerization.

2. A method comprising subjecting a composition consisting of anhydrous methyl α-chloroacrylate and a polymerization inhibitor to chromatographic purification by contacting said composition with a solid anhydrous adsorbent for said inhibitor in an inert atmosphere and at a temperature of from about −35° C. to about 25° C. for a time sufficient to remove the chromatographic impurities whereby the resultant anhydrous ester of α-chloroacrylic acid is adapted to form colorless polymers upon polymerization.

3. A method comprising subjecting a composition consisting of anhydrous methyl α-chloroacrylate and picric acid to chromatographic purification by contacting said composition with a solid anhydrous adsorbent for said inhibitor in an inert atmosphere and at a temperature of from about −35° C. to about 25° C. for a time sufficient to remove the chromatographic impurities whereby the resultant anhydrous ester of α-chloroacrylic acid is adapted to form colorless polymers upon polymerization.

4. A method comprising subjecting a composition consisting of anhydrous methyl α-chloroacrylate and p-tert-butylcatechol to chromatographic purification by contacting said composition with a solid anhydrous adsorbent for said inhibitor in an inert atmosphere and at a temperature of from about −35° C. to about 25° C. for a time suffficient to remove the chromatographic impurities whereby the resultant anhydrous ester of α-chloroacrylic acid is adapted to form colorless polymers upon polymerization.

5. The method of claim 3 wherein said solid anhydrous adsorbent is activated alumina.

6. The method of claim 4 wherein the said solid anhydrous adsorbent is activated alumina.

References Cited in the file of this patent

UNITED STATES PATENTS

| 2,301,270 | Gerlicher | Nov. 10, 1942 |
| 2,331,244 | Strickland | Oct. 5, 1943 |
| 2,499,811 | Barnes et al. | Mar. 7, 1950 |

FOREIGN PATENTS

| 606,685 | Great Britain | Aug. 18, 1948 |

OTHER REFERENCES

Quarendon, Manufacturing Chemist, vol. 14, pp. 251–254 (1943).

Strain, "Chromatographic Adsorption Analysis" (Interscience Publication; New York, 1942), pages 12 and 13.